United States Patent
Chiaretti et al.

(10) Patent No.: US 6,639,702 B1
(45) Date of Patent: Oct. 28, 2003

(54) OPTICAL MODULE FOR ACCESS NETWORKS TO WIDE BAND COMMUNICATION SYSTEMS AND RELEVANT PRODUCTION METHOD

(75) Inventors: Guido Chiaretti, Novate Milanese (IT); Antonio Fincato, Cameri (IT)

(73) Assignee: Italtel SpA, Milan (IT)

( * ) Notice: Subject to any disclaimer, the term of this patent is extended or adjusted under 35 U.S.C. 154(b) by 0 days.

(21) Appl. No.: 09/230,484

(22) PCT Filed: Jul. 23, 1997

(86) PCT No.: PCT/EP97/03970

§ 371 (c)(1),
(2), (4) Date: Mar. 16, 1999

(87) PCT Pub. No.: WO98/04943

PCT Pub. Date: Feb. 5, 1998

(30) Foreign Application Priority Data

Jul. 26, 1996 (IT) .......................... MI96A1588

(51) Int. Cl.[7] .......................... H04J 14/02; G02B 6/26; G02B 6/42
(52) U.S. Cl. .......................... 359/130; 385/15; 385/24
(58) Field of Search .......................... 385/15, 24; 359/130

(56) References Cited

U.S. PATENT DOCUMENTS

| | | | | |
|---|---|---|---|---|
| 4,441,181 A | * | 4/1984 | Winzer et al. .............. 359/130 |
| 5,042,895 A | * | 8/1991 | Chouinard et al. ............ 385/2 |
| 5,267,336 A | * | 11/1993 | Sriram et al. .................. 385/2 |
| 5,361,157 A | * | 11/1994 | Ishikawa et al. ............ 359/168 |
| 5,457,760 A | * | 10/1995 | Mizrahi ...................... 385/37 |
| 5,572,615 A | * | 11/1996 | Emori ......................... 385/92 |
| 5,737,104 A | * | 4/1998 | Lee et al. .................... 359/124 |
| 5,764,820 A | * | 6/1998 | De Dobbelaere et al. ..... 385/14 |
| 5,764,825 A | * | 6/1998 | Mugino et al. ............... 385/24 |

FOREIGN PATENT DOCUMENTS

| | | |
|---|---|---|
| EP | 0713109 | 5/1996 |
| WO | 9325014 | 12/1993 |

* cited by examiner

Primary Examiner—Jason Chan
Assistant Examiner—David C. Payne
(74) Attorney, Agent, or Firm—Birch, Stewart, Kolasch & Birch, LLP

(57) ABSTRACT

An optical module for access networks to wideband communication systems composed of passive optical networks PON, in such a way as to permit the transportation in particularly efficient manner of flows of numeric and/or analog information, relating to different types of services such as: telephone services in a broad sense, intended as traditional telephone services and data transmission services, and services of more strictly television nature such as the distribution of the CATV.

10 Claims, 3 Drawing Sheets

OPTICAL MODULE FOR ACCESS NETWORKS TO WIDE BAND COMMUNICATION SYSTEMS AND RELEVANT PRODUCTION METHOD

This application is the national phase under 35 U.S.C. §371 of prior PCT International Application No. PCT/EP97/03970 which has an International filing date of Jul. 23, 1997 which designated the United States of America.

FIELD OF THE INVENTION

This invention refers to an optical module for access networks to wide band communication systems composed of passive optical networks PON, in such a way as to permit the transportation in particularly efficient manner of flows of numeric and/or analog information, relating to different types of services such as:

- telephone services in a broad sense, intended as traditional telephone services and data transmission services;
- services of more strictly television nature such as the distribution of the CATV.

The access network is commonly identified by one or more connecting interfaces (of type V) in power-station and by various types of interfaces (of type S) for the user terminals, normally placed end to end to apparatuses positioned near the users.

The apparatuses which are used for the above purpose in the access network, and which form the so-called PON access system, are represented by a line termination (Optical Line Termination, or briefly OLT), generally placed or positioned near a switching station, and by a plurality of network units (Optical Network Units or briefly ONU), typically placed near the users, connected to the same OLT through a passive optical network, according to a layout like that illustrated in FIG. 1.

The passive optical network, which forms the so-called access network infrastructure, has typically tree or point-multipoint structure, where the root is connected to the OLT and the terminal branches to each ONU, and is composed of pieces of optical fiber interlinked by passive optical components, called power splitter/combiners, which make it possible to split the optical power between the outputs or recombine the optical signals present at the inputs.

The operators of the above mentioned wide band communication systems have assumed a plurality of methods through which to link the single residential users to the PON network.

One of these methods provides, for example, that the passive optical network reaches a pavement or a building, and, after having made a conversion of the optical signals into electrical signals, the latter are sent to the single users, for example through an equal number of pieces of coaxial cable.

A second method provides instead that the passive optical network is extended until it reaches the single residential users and the invention is preferentially applied when this second method is adopted. The optical module in question is indicated in FIG. 1 with MO and has the function of sending:

- to a first termination unit NT_T the signals which transit on the PON relating to the above mentioned telephone services;
- to a second termination unit NT_V the signals which transit on the PON relating to the above mentioned television services.

As known, the transmission systems on optical fiber predominantly use predetermined "windows" or bands of the optical spectrum through which the transmission of the signals along the fibers takes place with a minimum attenuation.

Carrying signals or communication channels, each with its own precisely defined wavelength, as produced by a relevant laser generator, included in one of these privileged windows, or bands modulable in intensity (commonly in digital or analog mode), may be transmitted along an optical fiber with extremely low losses:

The simultaneous transmission of various communication channels belonging to a certain band, or window, or channel on a same fiber, is made possible by operating in Wavelength Division Multiplexing (WDM).

Therefore, in the present context, the term "channel" indicates a certain band of the optical spectrum or "windows", used for the transmission of wavelength division multiplexed (WDM) optical signals.

In other words, the term optical band indicates a continuous wavelength interval which may house various optical channels, for example one or more channels for data transmission, one or more channels of telephone type, one or more channels of television type with simple or high definition etc.

In relation to the above, communications of a certain type such as telephone communications by voice or by data, maybe defined between 1260 and 1350 nm. With the same logics, the so-called 3rd useful window, whose passband goes from approximately 1480 to 1580 nm, may be destined or reserved for video transmissions via cable.

Therefore a certain transmission system with optical fibers, operating with carrying signals with a wavelength included in the passband of a first channel or window, whose central or main wavelength is $\lambda 1$ (for example 1310 nm), may also support transmissions made in a second channel or window, whose central or main wavelength is $\lambda 2$ (for example 1550 nm).

At each user the problem arises of separating the signals transmitted in the 1310 nm band from the signals transmitted in the 1550 nm band.

When the operator provides the allocation of digital signals of telephonic type (for example for traditional and/or data telephony) in the 1330 nm band and the signals for diffusive television in the 1550 nm band, the installation is required on each user's permises of the above mentioned optical module MO which is illustrated in detail in FIG. 2.

As required by some operators, this module includes:

- a device named WDM (Wavelength Division Multiplexing) to whose input is connected an optical support 1 on which transit both the signals allocated in the optical band $\lambda 1$ and the signals allocated in the optical band $\lambda 2$ which is therefore suitable to
  i) make available at a first output the optical signals allocated in the optical band $\lambda 1$, that is allocated in the 1310 nm band;
  ii) make available at a second output the signals allocated in the optical band $\lambda 2$, that is allocated in the 1550 nm band;
- an optical power splitter/combiner suitable to split in practically equal manner on two output branches the optical power associated to the input signal;
- an RIV detector suitable to supply a level signal proportional to the optical power which crosses the fiber connected to one of the output branches of the optical power splitter/combiner 2;
- a laser diode LA_D at 1310 nm suitable to send on the other branch of the splitter/combiner optical signals derived from the digital signals of telephonic type, which, as known, need a transmission of bi-directional type;

a further optical support 3 connected to the second output of this WDM which presents such a radius that the output direction is at 180° with respect to that of the input in order to provide the presence of all the interlinking organs on the front side of the optical module MO.

Since, as mentioned above, there is one optical module for each user, its cost must be very limited in order not to be an obstacle for the diffusion of the multimedial services in question.

The most promising technology for the purpose of limiting the costs is the "glass on silicon" technology, but it should be borne in mind that the use of this technology is marked by the present of some steps of the production process which need rather long execution times, and in particular one of these steps needs a rather long stay inside special furnaces of the sublayer of silicium for the laying of the layers of glass forming the waveguides.

To permit a better appreciation of the advantages deriving from the precepts indicated in this invention, it is pointed out that the cost of these furnaces is quantifiable at approximately 1 million US dollars for each set of furnaces necessary for the purpose.

The limitation of the production costs of the optical module in question may therefore only be achieved if it is possible to limit its dimensions from which to be able to construct on a single wafer of silicium a very high number of optical modules.

As indication it is pointed out that the usual dimensions of this module are today approximately 5÷30 mm and therefore for production volumes up to several millions of modules/year large investments are necessary, in particular correlated to the cost of these furnaces.

Since, however, as mentioned above, the above mentioned piece of waveguide has a radius of around 180°, making use of usual phosphor-doped glass to construct the above mentioned optical support or wave guide 3, if the radius is lower than a predetermined amount, the optical losses become unacceptable.

For example, the compliance with the above mentioned width of 55 mm imposes that the radius is not over 2 mm, while, making use of the normal phosphor-doped glass, the minimum obtainable radius is equal to approximately 10 mm. Making use of this type of glass, reducing the curve with respect to this value, the losses become unacceptable.

BACKGROUND ART

In order to obtain the limitation of the above mentioned dimensions, it has been suggested to abandon the approach aimed at the reduction of the above mentioned radius and to achieve this objective by making use of a particular WDM*, inside which, in suitable position, is placed a dichroic interferential filter 4, that is a reflecting element as illustrated in FIG. 3 relating to the $\lambda 2$ at 1550 nm.

As known, this interferential filter is composed of a glass on which are laid plurality of layers of oxides which give it the property of being transparent to the optical band $\lambda 1$ and of reflecting instead the optical band $\lambda 2$, which is then coupled to the second output of the WDM* unit.

This WDM* unit is composed of a section of waveguide which runs parallelly to the wave guide of input 1 for a length L/2, where L is the length of the coupling necessary to determine the transfer of all the optical power from the waveguide 1 to the waveguide 2.

The waveguide constructing this section of length L/2 is in practice continued to construct said piece of wave guide which transports the optical band $\lambda 2$ on the side of the module provided to support the connectors.

In reality, the waveguide which corresponds to the output of the WDM* unit is cut transversally, usually through an operation of cutting or incision or of excavation, then the above mentioned interferential filter is positioned in the furrow thus obtained.

The optical module constructed according to the known art fully achieves the objective of the above mentioned dimensional limitation, but the relevant production process presents the following problems.

The cutting operation may be carried out with fairly modest tolerances (±100÷50 $\mu$m) which involve considerable processing waste correlated to the non-compliance with the above mentioned length L/2 of the WDM unit.

The cutting operation must be followed by a costly lapping operation to polish the end of the interrupted waveguide.

The positioning of this interferential filter must be made by hand, module by module, using expensive equipment for the automatic positioning which annuls the advantage of reduced cost deriving from the reduced dimensions and of the resulting low investment in equipment for the manufacture of the optical guide.

To sum up, the module constructed according to the invention is a module of hybrid type constructed in part with integrated optics (waveguide) and in part with traditional microoptics (interferential filter).

The use of particular glass doped with germanium which has the intrinsic power of strongly guiding the light is also described in literature.

The use of this technology involves, however, high investments in the purchase of furnaces which deposit glass then destined to be submitted to a doping process using the germanium as doping element.

The invention necessary for the purchase of the relevant equipment for the production of glass doped with germanium is, however, similar to that for the production of phosphor-doped glass and estimable at around one million US dollars.

OBJECT OF THE INVENTION

The object of this invention is to identify an optical module which does not need the use of microoptical component of any type, such as the above mentioned interferential filter.

Another object is to identify a production method which makes it possible to obtain the above mentioned dimensional limitation using only integrated optical components.

A further object is to construct the above mentioned optical module without the use of special glass, such as the glass doped with germanium mentioned above.

DISCLOSURE OF THE INVENTION

This object is achieved by means of the optical module for access networks to wide band communication systems of the type including at least:

a first multiplexer in wavelength suitable to receive in input an optical support, coming from a predetermined side of the module, in which transit signals allocated in a first and in a second optical band and suitable to make available on a first output the signals allocated in this first optical band and on a second output the signals allocated in this second optical band, and a second optical support, one end of which is adapted to correspond to a predetermined side of the optical module;

a reflecting element placed downstream from one of the optical branches of the first multiplexer in wavelength, characterized by the fact that to the second output of the first multiplexer in wavelength is connected a second multiplexer in wavelength of the propagating and counterpropagating type incorporating the reflecting element, the other end of the second optical support being connected to the output of the second multiplexer in wavelength.

An additional object of the present invention is a method for the production of an optical module for access networks to wide band communications systems of the type including at least a first multiplexer in wavelength suitable to receive in input a first optical support, coming from a predetermined side of the module, in which transit signals allocated in a first and in a second optical band and to make available on a first output the signals allocated in the first optical band and on a second output the signals allocated in the second optical band, and a second optical support, one end of which is adapted to correspond to the predetermined side of the optical module;

a reflecting element placed downstream from one of the optical branches of the first multiplexer in wavelength, characterized by the fact that it provides the steps of:

laying on a single water of silicon optical supports forming the first multiplexer in wavelength, the optical support and a second multiplexer in wavelength of the propagating and counterpropagating type;

performing a structure of definition of an area of attack of the ends of the optical supports forming the second multiplexer in wavelength defining it photolithographically by means of a masking process;

chemically attacking the area not involved in the masking with an attack technique of the glass used to construct these optical supports until they are totally removed in such a way as to verticalize their front face;

laying on said front face of the optical supports a layer of material reflecting the light.

BRIEF DESCRIPTION OF THE DRAWINGS

The feature of the present invention which are believed to be novel are set fort with particularity in the appended claims.

The invention, together with further objects and advantages thereof, may be understood with reference to the following description taken in conjunction with the accompanying drawings, and the several figures of which like referenced numerals identify like elements, and in which.

DETAILED DESCRIPTION OF A FIRST EMBODIMENT OF

THE OPTICAL MODULE CONSTRUCTED ACCORDING TO THE INVENTION

Figure 4:
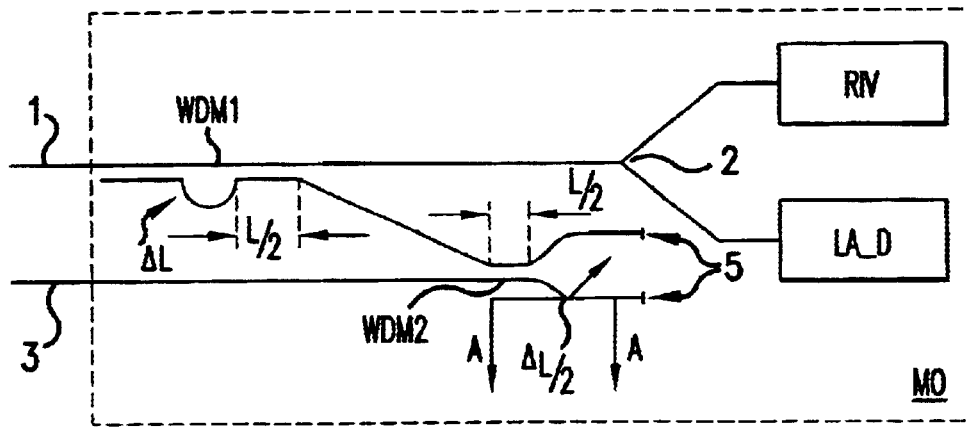
FIG. 4 shows a first embodiment of the optical module constructed according to the invention.

In FIG. 4 is illustrated a first embodiment of the optical model indicated in the invention which includes a first WDM, here countermarked with WDM1, preferentially constructed by means of a Mach-Zehnder interferometer which, as known, is a device suitable to realize the insertion or extraction of a signal or of a certain optical channel of a certain wavelength on an optical fiber carrying another optical signal or optical channel.

Figure 5:
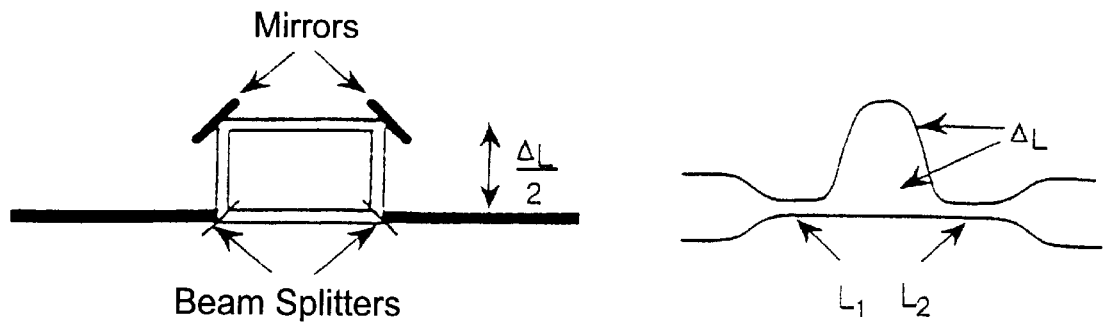
FIG. 5 shows the conformation of a Mach-Zehnder interferometer.

With reference to the diagram in FIG. 5, a Mach-Zehnder interferometer is essentially composed of a first directional input coupler whose structure is essentially that of two optical paths (for example two waveguides) brought near o one another for a certain "coupling" length L1 and of a second directional output coupler with coupling length L2. Unlike a manufacturing technique with "merged fibers", in a form of integrated manufacture the two optical paths in the two directional couplers of input and output are not merged but are defined in such a way as to develop parallely one to the other at a certain distance of separation (not shown in figure for graphic needs).

The intermediate stage of the device is essentially a phase shifting stage suitable to determine a certain difference $\Delta L$ of the optical path on the two branches of the device.

The characteristic attentuation curve of a common Mach-Zehnder interferometer is substantially of periodic type and characterized by relatively selective peaks which are exploited to inject a certain frequency (wavelength centered to one of these peaks) in fiber and/or to extract it.

Figure 1:
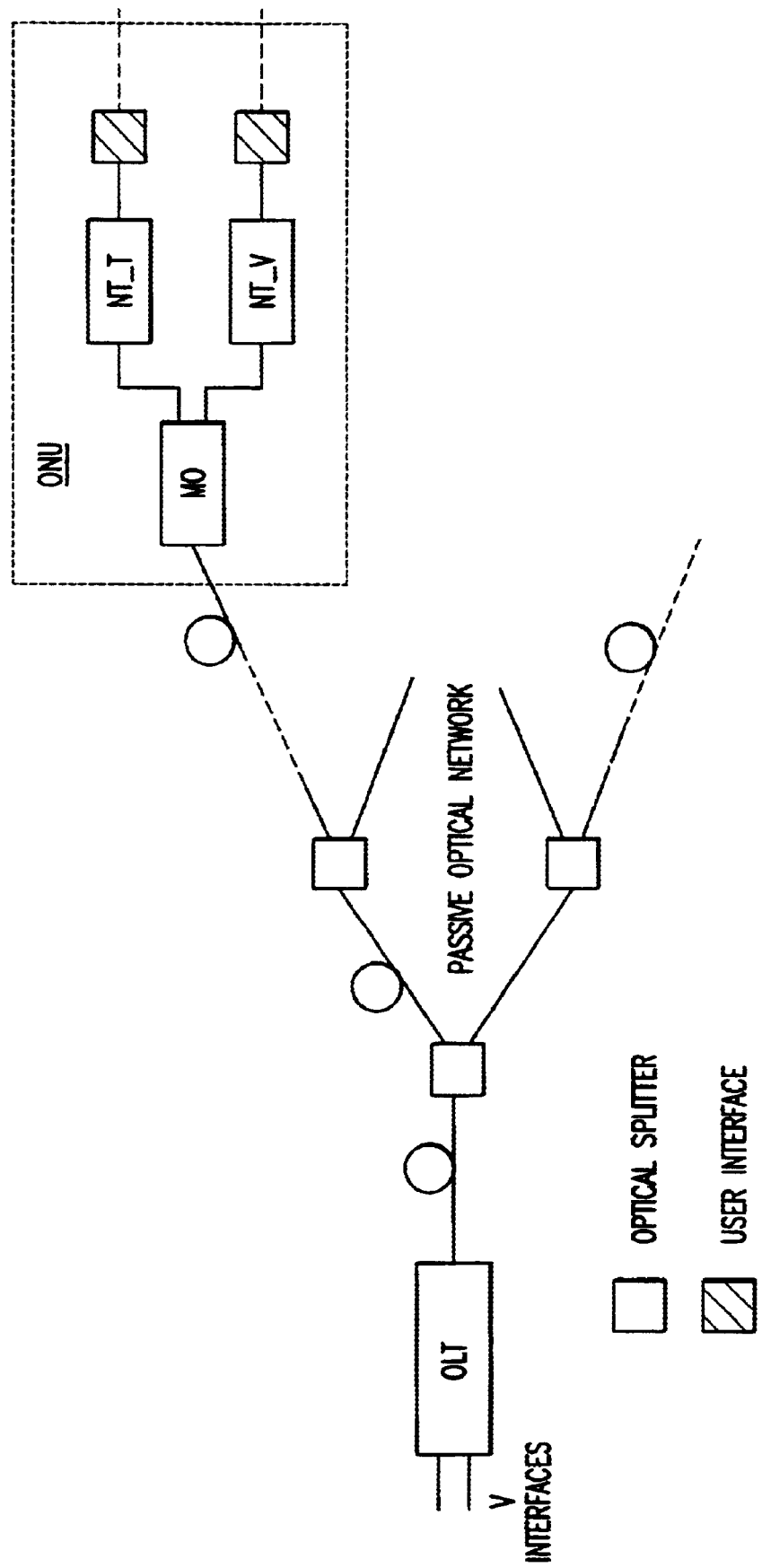
FIG. 1, already described, shows the architecture of the access network to a wide band communication system.
Figure 2:
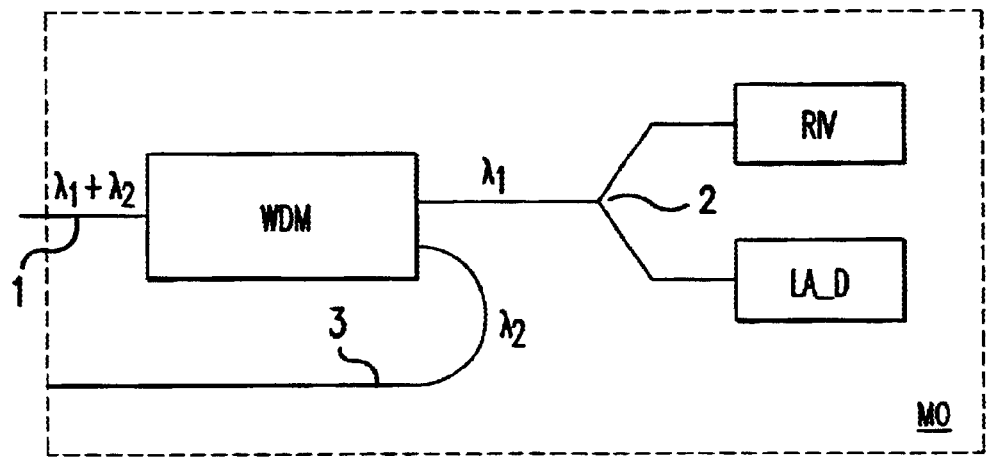
FIG. 2, already described, shows the general architecture of the optical module in question.
Figure 3:
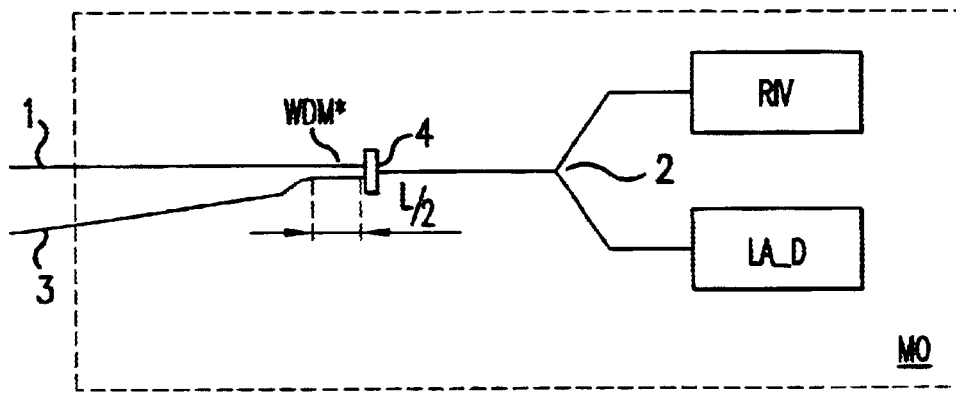
FIG. 3, already described, shows an optical module constructed in conformance with the known art.

Similar to everything described with reference to the basic layout of FIG. 2, to the first output of WDM1 unit is connected the optical power splitter/combiner 2 on which transit the luminous radiations allocated in the optical band $\lambda 1$ which therefore reach the detector RIV, the laser LA_D, similarly to everything described with reference to FIG. 2, sends luminous radiations on the second branch of the splitter/combiner.

The luminous radiations allocated in the optical band $\lambda 2$ correspond instead to the second output of the unit WDM1 and reach a particular Mach-Zehnder interferometer WDM2, here subsequently named propagating and counter-propagating interferometer.

This interferometer includes, in fact, a first directional coupler with a predetermined length A/2 and a portion of this intermediate stage $\Delta L$ composed of two pieces of wave guide of different length and such that their difference is equal to $\Delta L/2$, that is half of the difference L between the lengths of the two guide sections of the interferometer WDM1.

Preferentially the end portion of the interferometer WDM2 is rectilinear for the reasons indicated below.

This rectilinear portion is protected by a mask and then submitted to chemical attack in such a way as to verticalize the front surfaces of the two waveguides.

Figure 6:
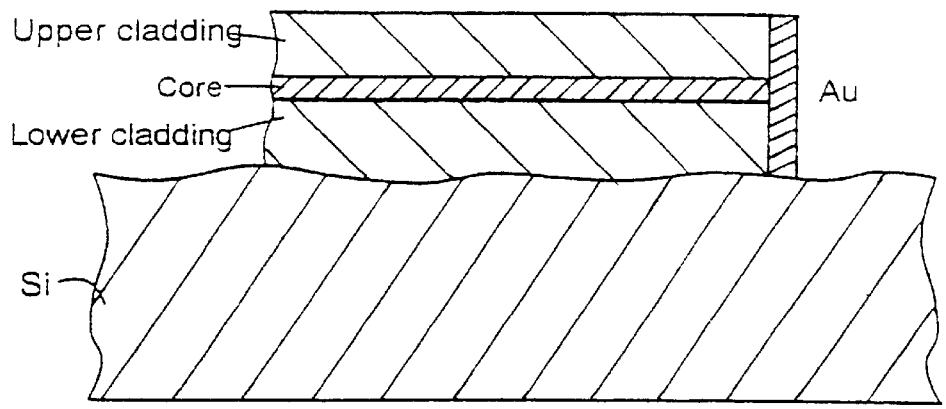
FIG. 6 shows a section of the module in FIG. 4 made according to the plane A—A.

On these vertical surfaces is then laid in known manner a metal layer such as a layer of gold as illustrated in the section of FIG. 6 which shows the wafer of silicium Si sectioned to show the presence of the support in silicium and of the waveguide composed of the lower cladding, of the core and of the upper cladding.

The layer of metal acts as reflecting element which reflects the luminous radiations allocated in the optical band λ2 towards the piece of the waveguide 3 which ends on the front face of the module.

The advantages of the invention are evident. The module is entirely constructed in integrated optics not incorporating any component in microoptics. Moreover, it does not present any critical aspect since the masks may be positioned with a decidedly higher precision that obtainable with said cutting operation.

Finally, if the chemical attack is carried out on said rectilinear sections placed at the end of the unit WDM2, no degree of precision of the positioning of the masks is required with priority.

In other words, the invention makes it possible to construct a passive chip of very limited dimensions and equal to approximately 2÷20 mm, even lower than those of similar chips of known type which present dimensions equal to approximately 5÷30 mm and as mentioned above make use of components in microoptics.

DETAILED DESCRIPTION OF A SECOND EMBODIMENT OF THE INVENTION

Figure 7:
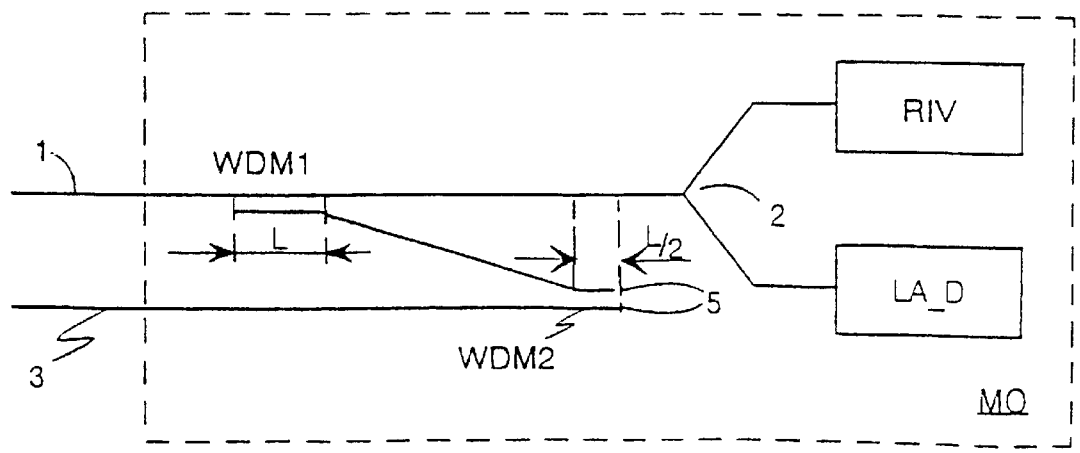
FIG. 7 shows a second embodiment of the optical module constructed according to the invention.

FIG. 7 details a second embodiment of the invention which differs from the previous one for the fact that the unit WDM1 is preferentially constructed by means of a directional coupler and also the unit WDM2 is constructed by means of a particular type of directional coupler.

As known, a directional coupler may be constructed by means of two optical paths (for example two wave guides) brought near to each other for a certain length of "coupling" L. In particular, if this length is suitably dimensioned, the luminous radiations which transit on a first optical path and which present wavelength coinciding with that for which the coupler has been sized, "couple" at the second optical path with negligible losses.

The first coupler WDM1 is of traditional type and has therefore a coupling length L, while the second coupler WDM 2 is of particular type and has a coupling length L/2.

Similarly to everything described with reference to the first embodiment, the terminal portion of this coupler is protected by a mask then submitted to chemical attack in such a way as to verticalize the front surfaces of the two waveguides.

On these vertical surfaces is then deposited in known manner a layer of metal as illustrated previously with reference to FIG. 6.

The layer of metal acts also in this case as reflecting element with the same functionalities illustrated above.

The second embodiment makes it possible to contain, in equal manner to said first embodiment, the width of the module. As regards the length of the module, this second embodiment makes it possible to obtain a further dimensional limitation, to the advantage of the number of devices producible in the unit of time and of the number of the wafers of silicium required to produce them, since it presents a width equal to 2÷3 mm and a length equal to approximately 15 mm.

While a particular embodiment of the present invention has been shown and described, it should be understood that the present invention is not limited thereto since other embodiments may be made by those skilled in the art without departing from the scope thereof.

It is thus contemplated that the present invention encompasses any and all such embodiments covered by the following claims.

What is claimed is:

1. An optical module comprising:
    a first multiplexer receiving a signal input to said optical module along a first waveguide and having at least a first signal component, in a first optical band, and a second signal component, in a second optical band, said first multiplexer separating said first and second signal components and outputting said first and second signal components via separate outputs; and
    a second multiplexer operatively connected to said first multiplexer to receive said first signal component along a second waveguide, said second multiplexer containing a reflective element and operating to output a signal, along a third waveguide, in the opposite direction of said signal input to said optical module, wherein said reflecting element is integrated into said second multiplexer, and said first, second, and third waveguides are separate waveguides and are substantially parallel.

2. An optical module according to claim 1, wherein
    at least one of said first multiplexer and said second multiplexer is a Mach-Zehnder interferometer.

3. An optical module according to claim 1, wherein
    at least one of said first multiplexer and said second multiplexer is a directional coupler.

4. A method for producing an optical module comprising the steps of:
    depositing a first multiplexer on a single semiconductor wafer, said first multiplexer having an input on one side and two outputs on the opposite side of the input;
    depositing a second multiplexer on said single semiconductor wafer, said second multiplexer having an input and an output on one side and a reflective element on the opposite side;
    depositing connections on said single semiconductor wafer, such that a connection to the input of said first multiplexer is deposited, a connection to one output of said first multiplexer is deposited, a connection from the second output of said first multiplexer to the input of said second multiplexer is deposited, and a connection to the output of said second multiplexer is deposited;
    defining an etch area at the second multiplexer ends by means of a mask;
    chemically etching the area outside said mask by means of an oxide etch technique in such a way to verticalize the front face of said etch area of said second multiplexer; and
    depositing on said front face a layer of light reflecting material in order to define a reflecting element integrated in said second multiplexer.

5. The method according to claim 4, wherein
    said light reflecting material comprises gold.

6. The method according to claim 4, wherein
    at least one of the deposited first multiplexer and the deposited second multiplexer is a Mach-Zehnder interferometer.

7. The method according to claim 4, wherein
    at least one of the deposited first multiplexer and the deposited second multiplexer is a directional coupler.

8. An optical module comprising:
    a first multiplexer receiving a signal input to said optical module and having at least a first signal component, in a first optical band, and a second signal component, in a second optical band, said first multiplexer separating said first and second signal components and outputting said first and second signal components via separate outputs; and a second multiplexer operatively connected to said first multiplexer to receive said first signal component, said second multiplexer containing a reflective element and operating to output a signal in the opposite direction of said signal input to said optical module, wherein said reflecting element is integrated into said second multiplexer, wherein said reflecting element is integrated on the front face of an etched and verticalized surface of said second multiplexer.

9. An optical module according to claim 8, wherein at least one of said first multiplexer and said second multiplexer is a Mach-Zehnder interferometer.

10. An optical module according to claim 8, wherein at least one of said first multiplexer and said second multiplexer is a directional coupler.

* * * * *